(12) United States Patent
Sam

(10) Patent No.: US 10,083,338 B2
(45) Date of Patent: Sep. 25, 2018

(54) OPTICAL FINGERPRINT SENSOR WITH PRISM MODULE

(71) Applicant: IDspire Corporation Ltd., New Taipei (TW)

(72) Inventor: Ri Mun Sam, New Taipei (TW)

(73) Assignee: IDSPIRE CORPORATION LTD., New Taipei (TW)

( * ) Notice: Subject to any disclaimer, the term of this patent is extended or adjusted under 35 U.S.C. 154(b) by 0 days.

(21) Appl. No.: 15/218,112

(22) Filed: Jul. 25, 2016

(65) Prior Publication Data

US 2018/0025204 A1   Jan. 25, 2018

(51) Int. Cl.
  *G06K 9/74*   (2006.01)
  *G06K 9/00*   (2006.01)
  *G02B 5/04*   (2006.01)

(52) U.S. Cl.
  CPC .......... *G06K 9/00046* (2013.01); *G02B 5/04* (2013.01)

(58) Field of Classification Search
  CPC .... G01J 4/00; G01J 3/02; G01J 3/0208; G01J 3/0229; G01J 3/0294; G01J 3/04; G01J 3/18; G01J 3/2803; G02B 26/10; G02B 27/40; G02B 6/06; G02B 7/365; G01N 2021/3144; G01N 2021/6419; G01N 21/8851
  See application file for complete search history.

(56) References Cited

U.S. PATENT DOCUMENTS

| | | | | |
|---|---|---|---|---|
| 5,109,427 A | * | 4/1992 | Yang | A61B 5/1172 356/458 |
| 6,643,390 B1 | * | 11/2003 | Clark | G06K 9/00046 356/71 |
| 6,826,000 B2 | * | 11/2004 | Lee | A61B 5/103 356/71 |

(Continued)

*Primary Examiner* — Michael P Stafira
(74) *Attorney, Agent, or Firm* — Bacon & Thomas, PLLC

(57) ABSTRACT

The invention is an optical fingerprint sensor with prism module, including a shell; an optical prism arranged in the shell, the optical prism comprising a collection surface, a basal plane, a mirror surface and an output surface, there being a first included angle provided between the mirror surface and the collection surface, a second included angle provided between the mirror surface and the basal plane, a third included angle provided between the output surface and the collection surface, and a fourth included angle provided between the output surface and the basal plane; and an image sensing unit combined with the shell, comprising multiple luminous elements arranged beneath the basal plane of the optical prism correspondingly, and an image receiver and a lens arranged corresponding to the output surface. Thereby, an user is allowed to place fingerprint onto the collection surface for a light source of the luminous elements to be input from the basal plane and irradiated onto the fingerprint, and a light ray undergoes a first reflection and a second reflection with the basal plane and the mirror surface, respectively. After that, the output surface acts as a background surface and a light ray output as the light ray undergoes the second reflection for the image receiver to receive the light ray and form a fingerprint image, such that the advantages of maintaining an optical path effectively and reducing the volume of the optical fingerprint sensor are accomplished.

2 Claims, 6 Drawing Sheets

(56) References Cited

U.S. PATENT DOCUMENTS

| | | | |
|---|---|---|---|
| 6,954,261 B2* | 10/2005 | McClurg | G06K 9/00046 356/71 |
| 2003/0025897 A1* | 2/2003 | Iwai | G06K 9/0012 356/71 |
| 2008/0239285 A1* | 10/2008 | Wang | G06K 9/00046 356/71 |

* cited by examiner

OPTICAL FINGERPRINT SENSOR WITH PRISM MODULE

BACKGROUND OF THE INVENTION

Field of the Invention

The invention is an optical fingerprint sensor with prism module, particularly, which can be used for fingerprint collection.

Descriptions of the Related Art

Typically, a conventional optical fingerprint image acquisition device may be composed of a prism, a convex lens, an image sensor and a light source generally, in which the prism is arranged as an inverted triangle, the convex lens corresponds to a first side of the prism, the image sensor is in correspondence with the convex lens, and the light source corresponds to a second side of the prism.

In use, an operator is allowed to place fingerprint on a third side of the prism while the light source performs irradiation from the second side of the prism and a light ray is reflected to the first side of the prism by a fingerprint image, and in turn, the light ray enters the convex lens, followed by focusing on the image sensor to, thereby, perform fingerprint recognition.

However, for the above conventional optical fingerprint image acquisition device, the volume of the prism thereof is usually constrained to shape and cannot be reduced, so that it cannot be employed on current compact electronic devices effectively.

In order to overcome the disadvantages of conventional optical fingerprint image acquisition devices, related patents are proposed, such as P.R.O.C. invention patent publication No. CN101034437 A, "Fingerprint Collecting Method and High-Resolution Thin Type Fingerprint Collector", which figures out existing issues of current technologies, including small acquisition and poor definition in existing technology. For its method, the light source is irradiated to the prism bottom through the prism, the fingerprint under the prism bottom reflects to reflection the prism oblique of the lumbar reflection mirror and black-paint layer on the prism bottom, the fingerprint images on reflective mirror and black paint layer project on the photoelectric detector through the back of prism and the projection lens. Collector is composed of the light source, a right angle trapezoidal prism which bottom longitudinal cross section greater than hight, lens and photo-electric detector; lens and photo-electric detector configuration on the back-side of prism, the ramp lumbar of prism having a reflector surface, a viewfinder with oblique configuration on the lateral of lens, the photoelectric detector above viewfinder, the characteristic is that the bottom of the prism is painted black, black paint layer and reflector mirror as a reflector surface. The method has the advantages of a larger fingerprint reflector, a greater acquisition area and high definition. Collector of small size, light weight, large area of collected fingerprint image, high clarity, collector and prism to achieve ultra-thin, is convenient to match with mouse, keyboard, door locks, cars, mobile phones and other equipments of space-constrained installation for use.

Additionally, P.R.C. invention patent publication No. CN CN102004912 B, "Fingerprint Acquisition Device", comprises a light source, a prism, a light detector and an image sensor. The prism has a fingerprint acquisition surface, a reflection surface and an outgoing surface. The light detector is provided with a lens, and reflectors which are respectively arranged between the outgoing surface and the lens and between the lens and the image sensor. Light emitted by the light source is incident upon the prism, and light emitted by the outgoing surface is detected in the observation angle range and transmitted to the image sensor. The reflection surface is not symmetric relative to the observation shaft of the light detector, such that the light exits from one angle of the prism, and the path of light is refracted back to spare space on one side of the prism through the reflection of the reflectors. Thus, it has the advantage of reducing volume, and fitting tendency of product miniaturization.

The light enters the prism, followed by outputting to the photoelectric detector with reflection for reducing a single optical path to reduce the volume of the fingerprint collection device in the patents mentioned above. Such an approach may improve shortages of traditional optical fingerprint image acquisition devices. However, those prisms with one reflection optical path still cannot satisfy current electronic products that are miniaturized (thinned) increasingly. Therefore, such various conventional products are still insufficient in practical applications.

In view of this, the inventor of the present invention has researched and developed an optical prism module with efforts in order to improve various shortages of above conventional technologies.

SUMMARY OF THE INVENTION

An objective of the invention is such that an operator is allowed to place fingerprint onto a fingerprint placement zone of a collection surface for a light source of luminous device to be input from the basal plane and irradiated onto the fingerprint, and a light ray undergoes a first reflection and a second reflection with the basal plane and the mirror surface, respectively. After that, the output surface acts as a background surface and a light ray output when the light ray undergoes the second reflection for the image receiver to receive the light ray and form a fingerprint image, such that the advantages of maintaining an optical path effectively and reducing the volume of the optical fingerprint sensor are achieved.

To achieve the above objective, the invention is an optical fingerprint sensor with prism module, including: a shell; an optical prism arranged in the shell, the optical prism comprising a collection surface arranged on the top of the optical prism, a basal plane corresponding to the collection surface and situated on a lowermost part of the optical prism, a mirror surface arranged on one end of the optical prism, and an output surface arranged on another end of the optical prism, and there being a first included angle provided between the mirror surface and the collection surface, a second included angle provided between the mirror surface and the basal plane, a third included angle provided between the output surface and the collection surface, and a fourth included angle provided between the output surface and the basal plane; and an image sensing unit combined with the shell, which comprises multiple luminous elements arranged beneath the bottom of the optical prism correspondingly, and a lens and an image receiver arranged corresponding to the output surface.

In the preferred embodiment, the shell comprises a base, and a housing combined on an outer side of the base and covering the optical prism and the image sensing unit.

In the preferred embodiment, the base has an accommodation area capable of containing the optical prism, and the bottom of the accommodation zone is provided with multiple through-holes corresponding to each of the luminous elements, respectively, and one end of the base is provided with a notch portion in which a fastener is mated, and one surface of the housing is provided with a hollow zone corresponding to the collection surface thereon.

In the preferred embodiment, the image sensing unit comprises further a flexible cable, one end of which is arranged on the bottom of the base for disposing each of the luminous elements, while the image receiver is arranged on another end of the flexible cable appropriately, after the image receiver corresponds to the output surface, another end of the flexible cable pierces the notch portion of the base partially, and is mated in the notch portion with the fastener to secure another end of the flexible cable.

In the preferred embodiment, the optical prism is made of transparent material, such as glass, plastic, quartz or crystal etc.

In the preferred embodiment, the first included angle is greater than or equal to 100 degrees and less than or equal to 125 degrees, the third included angle is greater than or equal to 75 degrees and less than or equal to 90 degrees, the fourth included angle is greater than or equal to 75 degrees and less than or equal to 90 degrees, the second included angle is 360 degrees subtracted by sum of the first included angle, the third included angle and the fourth included angle.

In the preferred embodiment, the length of the fingerprint placement zone is greater than or equal to 6 millimeters and less than or equal to 28 millimeters.

In the preferred embodiment, the length of the fingerprint placement zone is greater than or equal to 25 millimeters and less than or equal to 80 millimeters.

In the preferred embodiment, the length of the fingerprint placement zone is greater than or equal to 60 millimeters and less than or equal to 250 millimeters.

In the preferred embodiment, the length of the output surface is greater than or equal to 0.2 millimeter and less than or equal to 20 millimeters.

DETAILED DESCRIPTION OF THE PREFERRED EMBODIMENT

Figure 1:
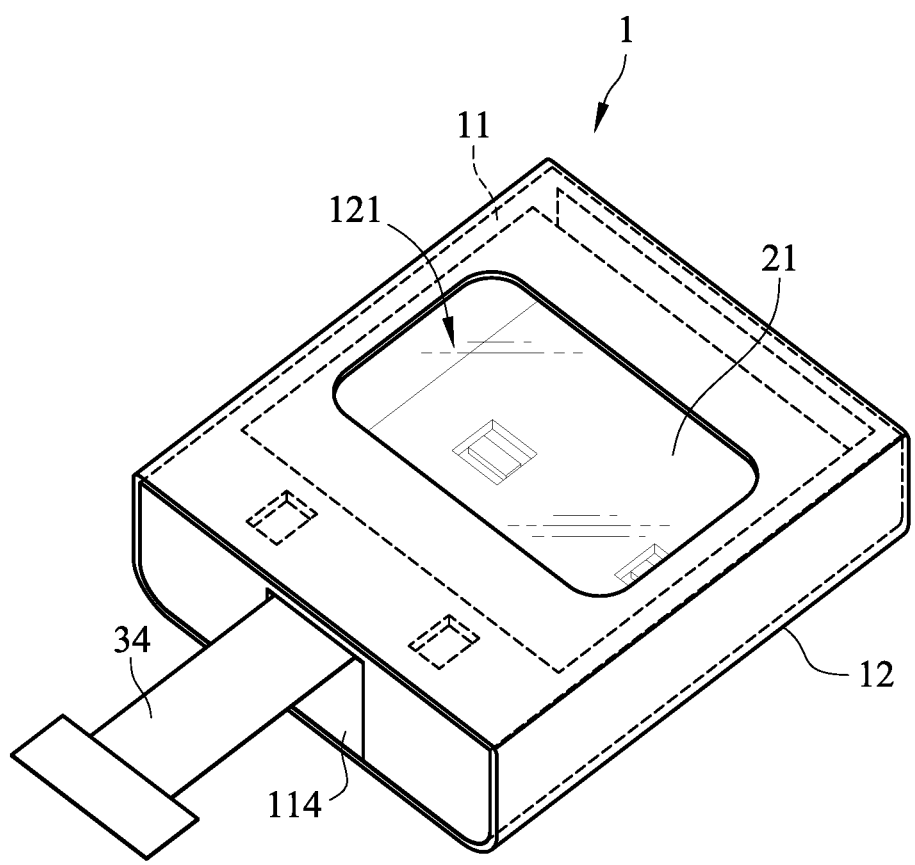
FIG. 1 is a stereo appearance schematic diagram of the invention.

The invention is illustrated in detail as following by means of an embodiment below in connection with appended drawings for thorough understanding of objectives, features and effects of the invention.

Refer to FIGS. 1, 2, 3 and 4, which are a stereo appearance schematic diagram of the invention, a stereo exploded schematic diagram of the invention, a cross-sectional structure schematic diagram of the invention and a schematic diagram showing an optical path in using the invention, respectively. As shown in the figures, the invention is an optical fingerprint sensor with prism module comprised at least of a shell 1, an optical prism 2 and an image sensing unit 3.

The shell 1 comprises a base 11, and a housing 12 combined on an outer side of the base 11 and covering the optical prism 2 and the image sensing unit 3, the base 11 having an accommodation area 111 for containing the optical prism 2 which bottom is provided with multiple through-holes 112, and one end of the base 11 is provided with a notch portion 113 in which a fastener 114 is mated, and one surface of the housing 12 is provided with a hollow zone 121 thereon.

Figure 5:
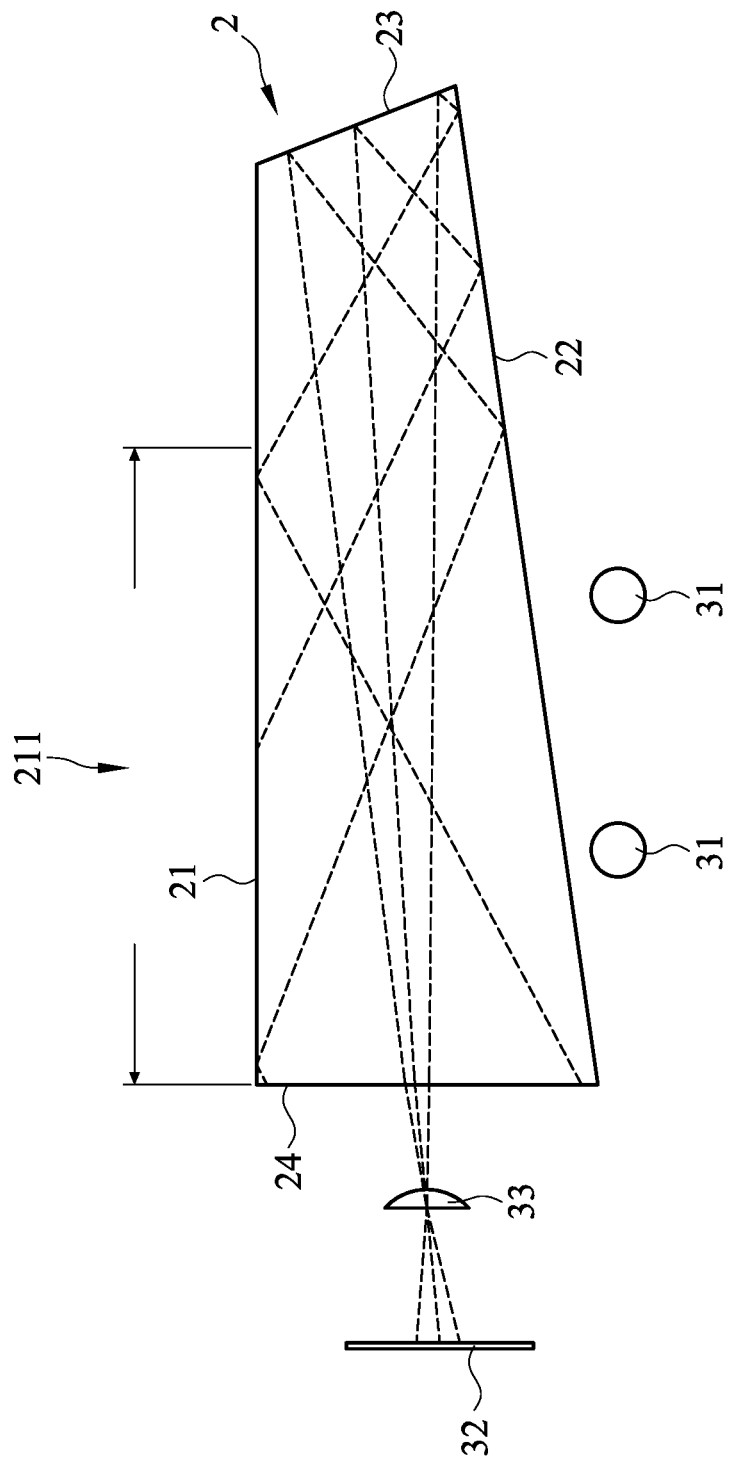
FIG. 5 is a schematic diagram showing an operation status of the invention.
Figure 6:
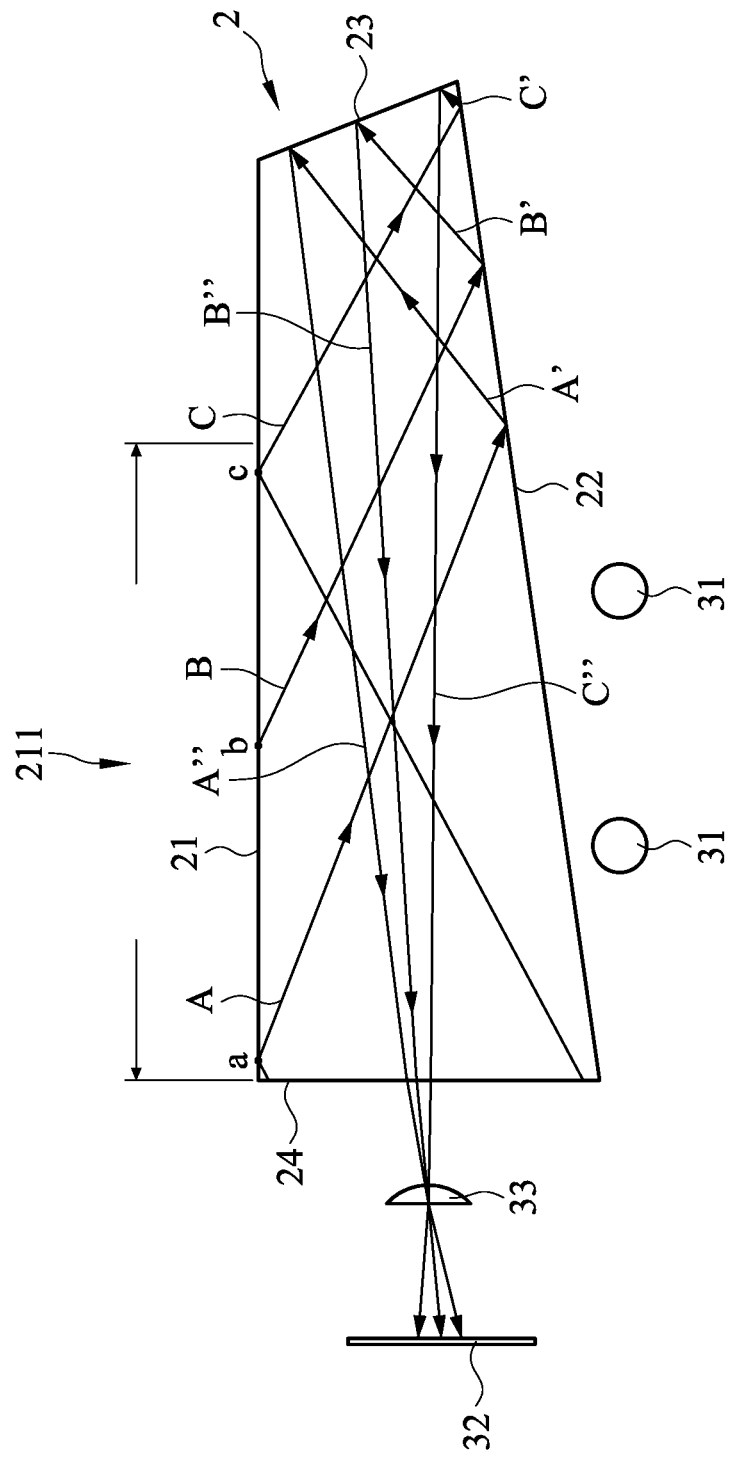
FIG. 6 is a schematic diagram showing another optical path in using the invention.

Refer to FIGS. 5 and 6, in which the optical prism 2 is arranged in the accommodation area 111 of the base 11, the optical prism 2 comprises a collection surface 21 arranged on the top of the optical prism 2 and corresponding to the hollow zone 121, a basal plane 22 corresponding to the collection surface 21 is situated on the bottom of the optical prism 2, a mirror surface 23 arranged on one end of the optical prism 2, and an output surface 24 arranged on another end of the optical prism 2, while there is a first included angle 201 provided between the mirror surface 23 and the collection surface 21, a second included angle 202 provided between the mirror surface 23 and the basal plane 22, a third included angle 203 provided between the output surface 24 and the collection surface 21, and a fourth included angle 204 provided between the output surface 24 and the basal plane 22; wherein the optical prism 2 is made of transparent material, such as glass, plastic, quartz or crystal etc. In the preferred embodiment, the first included angle 201 is greater than or equal to 100 degrees and less than or equal to 125 degrees, the third included angle 203 is greater than or equal to 75 degrees and less than or equal to 90 degrees, the fourth included angle 204 is greater than or equal to 75 degrees and less than or equal to 90 degrees, and the second included angle 202 is 360 degrees subtracted by a sum of the first included angle 201, the third included angle 203 and the fourth included angle 204. In addition, in the preferred embodiment, the length of the output surface 24 is greater than or equal to 0.2 millimeter and less than or equal to 20 millimeters (mm).

In the preferred embodiment, the length of the fingerprint placement zone 211 on the collection surface 21 may be selected according to number of fingers desired to be sensed. For example, the length of the fingerprint displacement zone 211 is greater than or equal to 6 millimeters and less than or equal to 28 millimeters (mm) when only one finger is under fingerprint collection; the length of the fingerprint displacement zone 211 is greater than or equal to 25 millimeters and less than or equal to 80 millimeters (mm) when two fingers are under fingerprint collection; the length of the fingerprint displacement zone 211 is greater than or equal to 60 millimeters and less than or equal to 250 millimeters (mm) when five fingers are under fingerprint collection.

In the invention, angle ranges of various included angles within the optical prism 2 are designed such that light rays may be focused onto the lens 33 after reflection within the prism, so that fingerprint images can be imaged onto the image receiver 32 correctly and clearly. In accordance with the theory of the invention, compared to conventional optical fingerprint image collectors, volumes of fingerprint acquisition device as the present invention may be further reduced and fingerprint collection area may be broader for either one, two or five fingers, such that there is more significant advantageous than the conventional fingerprint acquisition device used currently.

Figure 2:
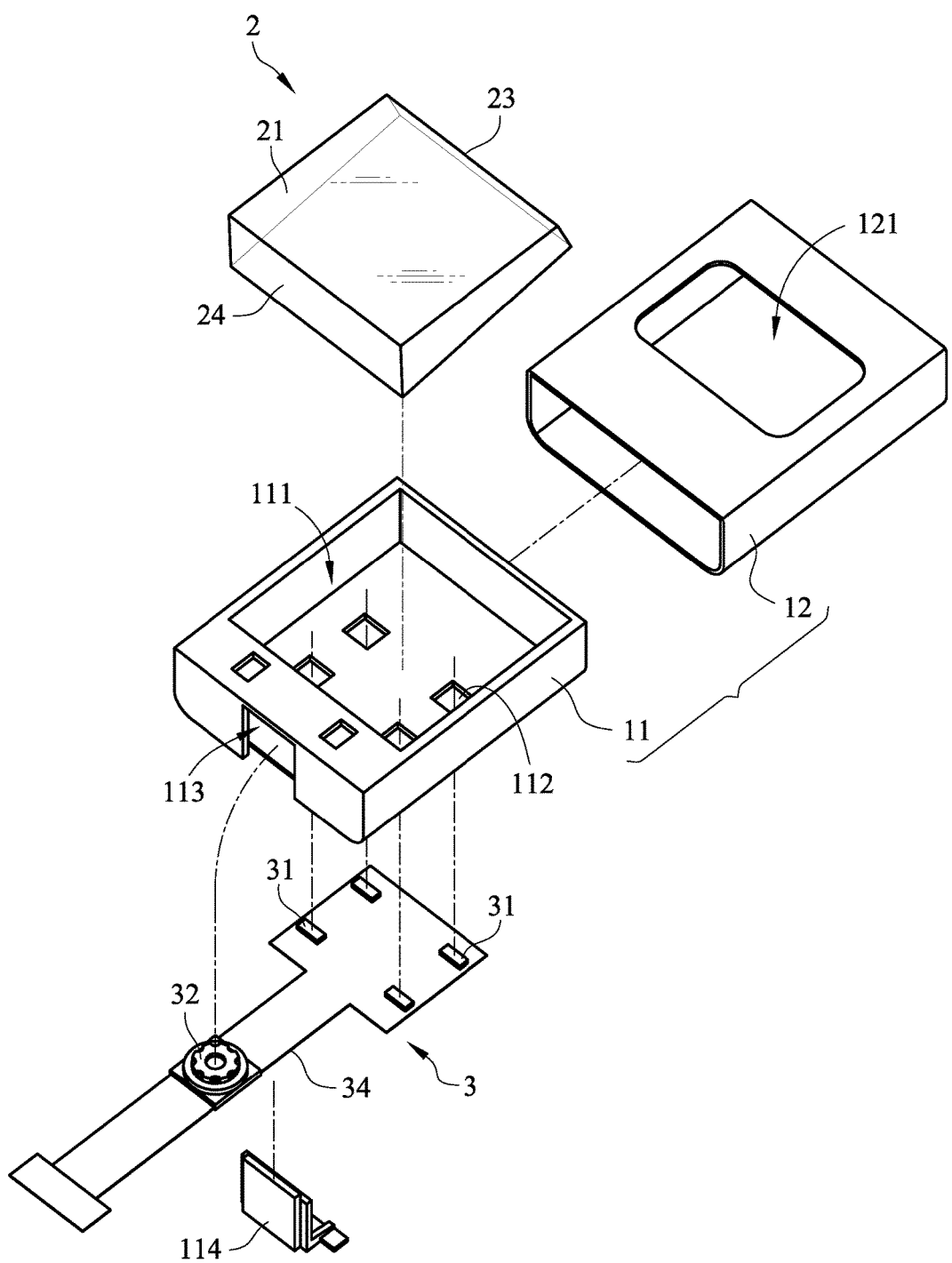
FIG. 2 is a stereo exploded schematic diagram of the invention.
Figure 3:
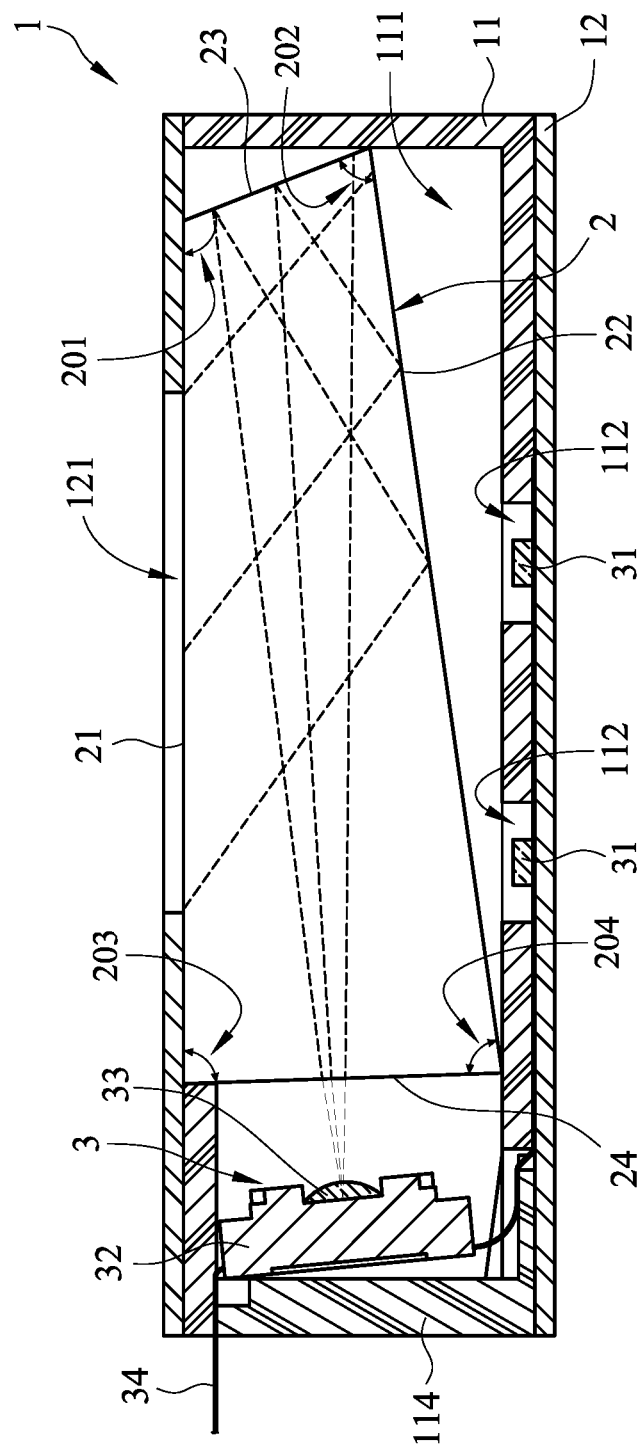
FIG. 3 is a schematic diagram showing a cross-sectional structure of the invention.
Figure 4:
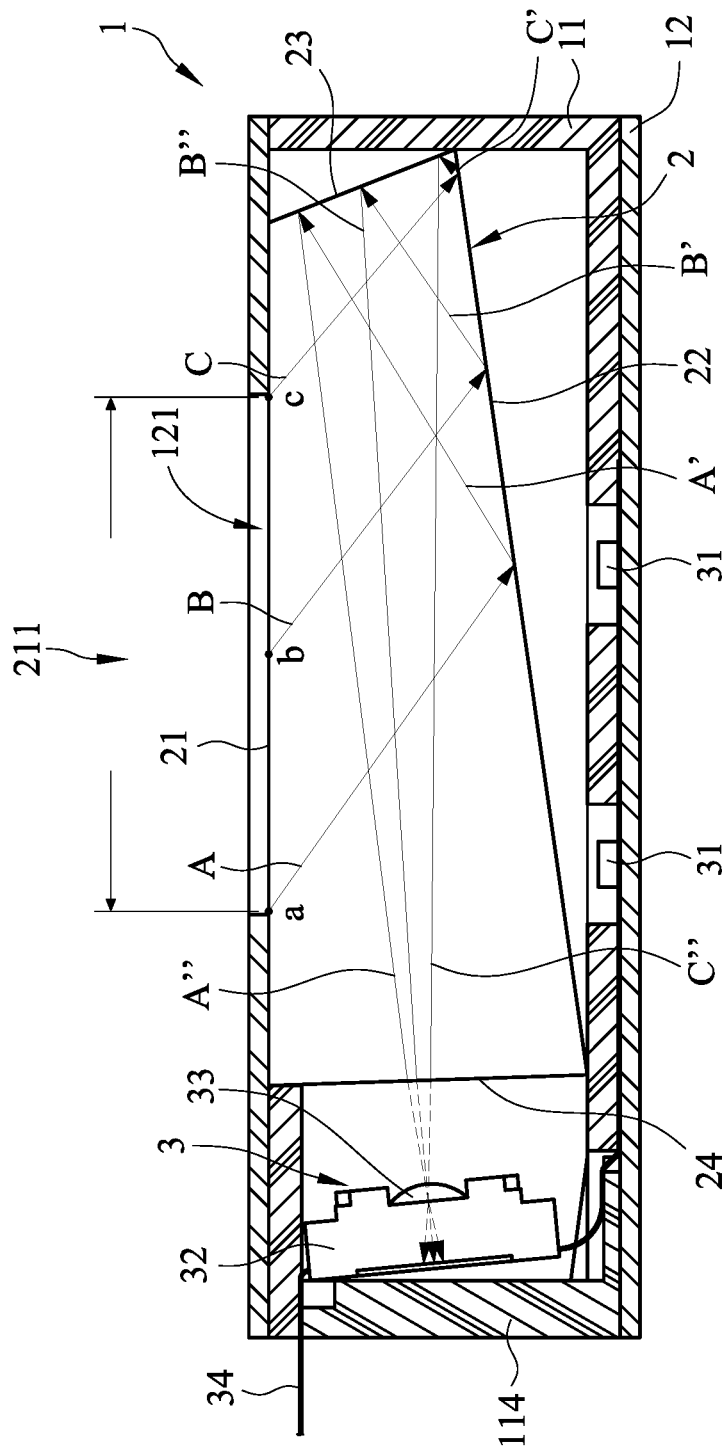
FIG. 4 is a schematic diagram showing an optical path in using the invention.

Refer to FIGS. 2-4, the image sensing unit 3 is combined with the shell 1, which comprises multiple luminous elements 31 corresponding to each of the through-holes 112 and arranged on basal plane 22 provided on the optical prism 2, respectively, and an image receiver 32 and a lens 33 arranged corresponding to the output surface 24, wherein the image sensing unit 3 comprises further a flexible cable 34, of which one end is arranged on the bottom of the base 11 for arranging each of the luminous elements 31, while the image receiver 32 and the lens 33 are arranged on another end of the flexible cable 34 appropriately. After the image receiver 32 corresponds to the output surface 24 is assembled, another end of the flexible cable 34 pierces partially the notch portion 113 of the base 11, and is mated in the notch portion 113 with a fastener 114 to secure another end of the flexible cable 34.

In employing the invention, the flexible cable 33 of the image sensing unit 3 may be utilized for connection with a related recognition device (not shown). Moreover, in addition to providing power necessary for the luminous elements 31 and the image receiver 32, the recognition device may recognize a fingerprint image received by the image receiver 32 to perform subsequent related recognition processes. The luminous element is LED for the present invention as the light source.

Moreover, refer to FIGS. 5 and 6, in using the invention, an user is allowed to place fingerprint onto the fingerprint placement zone 211 of collection surface 21 through the hollow zone 121 of the housing 12 for a light source of each of the luminous elements 31 to be input from the basal plane 22 and irradiated onto the fingerprint, and a light ray emitted by the light source forms a left end incident ray A at a left endpoint a, a central incident ray B at a central point b and a right end incident ray C at a right endpoint c by means of a bumpy texture of the fingerprint, which are projected onto the basal plane 22 for the left end incident ray A, the central incident ray B and the right end incident ray C to undergo a first reflection on the basal plane 22, while the basal plane 22 is used as both light plane and reflecting surface for the left end incident ray A, the central incident ray B and the right end incident ray C to form a left end first reflected ray A', a central first reflected ray B' and a right end first reflected ray C' reflected on the mirror surface 23, respectively. After that, the left end first reflected ray A', the central first reflected ray B' and the right end first reflected ray C' utilize the mirror surface 23 as a reflecting surface again to undergo a second reflection for the left end first reflected ray A', the central first reflected ray B' and the right end first reflected ray C' to form a left end second reflected ray A", a central second reflected ray B" and a right end second reflected ray C" reflected on the output surface 24, respectively, such that the left end second reflected ray A", the central second reflected ray B" and the right end second reflected ray C" utilize the output surface 24 to act as a background surface to perform output simultaneously to achieve consistency of the background surface and an imaging surface for the left end second reflected ray A", the central second reflected ray B" and the right end second reflected ray C" to be received through the lens 33 and the image receiver 32 and in turn to form a fingerprint image. Also, the fingerprint image is transmitted to the recognition device for subsequent related recognition processes. As a result, an optical path is maintained effectively by at least two reflections, and the volume of the prism may be miniaturized with increased number of optical path refractions, such that the volume of the optical fingerprint sensor may be reduced.

In summary of the description, the invention achieves the expected objectives thereof according to the description disclosed above actually. An operator is allowed to place the fingerprint onto the collection surface for the light source of the luminous elements to be input from the basal plane and irradiated onto the fingerprint, and for the light ray to undergo the first reflection and the second reflection with the basal plane and the mirror surface, respectively. After that, the output surface acts as the background surface and the light ray output in the second reflection of the light ray for the image receiver to receive the light ray and form a fingerprint image to achieve the advantages of maintaining the optical path effectively and reducing the volume of the optical fingerprint sensor.

It is noted that the description is only a preferred embodiment of the invention and any variations of equivalent modification according to the claims of the invention shall be within the substantial scope of the invention.

What is claimed is:

1. An optical fingerprint sensor with prism module, including:
   a shell;
   an optical prism arranged in the shell, the optical prism comprising a collection surface with a fingerprint placement zone arranged on the top of the optical prism, a basal plane corresponding to the collection surface and situated on the bottom of the optical prism, a mirror surface arranged on one end of the optical prism, and an output surface arranged on another end of the optical prism, and there being a first included angle provided between the mirror surface and the collection surface, a second included angle provided between the mirror surface and the basal plane, a third included angle provided between the output surface and the collection surface, and a fourth included angle provided between the output surface and the basal plane; and
   an image sensing unit combined with the shell, which comprises multiple luminous elements arranged beneath the bottom of the optical prism correspondingly, and an image receiver and a lens arranged corresponding to the output surface,
   wherein the shell comprises a base, and a housing combined on an outer side of the base and covering the optical prism and the image sensing unit,
   wherein the base has an accommodation area capable of containing the optical prism, and the bottom of the accommodation area is provided with multiple through-holes corresponding to each of the luminous elements, respectively, and one end of the base is provided with a notch portion in which a fastener is mated, and one surface of the housing is provided with a hollow zone corresponding to the collection surface thereon.

2. An optical fingerprint sensor with prism module, including:
   a shell;
   an optical prism arranged in the shell, the optical prism comprising a collection surface with a fingerprint placement zone arranged on the top of the optical prism, a basal plane corresponding to the collection surface and situated on the bottom of the optical prism, a mirror surface arranged on one end of the optical prism, and an output surface arranged on another end of the optical prism, and there being a first included angle provided between the mirror surface and the collection surface, a second included angle provided between the mirror surface and the basal plane, a third included angle provided between the output surface and the collection surface, and a fourth included angle provided between the output surface and the basal plane; and an image sensing unit combined with the shell, which comprises multiple luminous elements arranged beneath the bottom of the optical prism correspondingly, and an image receiver and a lens arranged corresponding to the output surface, wherein the image sensing unit comprises further a flexible cable, one end of which is arranged on a basal plane of the base for disposing each of the luminous elements, while the lens and the image receiver are arranged on another end of the flexible cable, after the image receiver corresponds to the output surface is assembled, another end of the flexible cable pierces the notch portion of the base partially, and is mated in the notch portion with the fastener to secure another end of the flexible cable.

\* \* \* \* \*